(12) United States Patent
Sivaramalingam et al.

(10) Patent No.: US 10,834,611 B1
(45) Date of Patent: Nov. 10, 2020

(54) NETWORK AVAILABILITY NOTIFICATION IN PREDEFINED TRAVEL SCENARIOS

(71) Applicant: INTERNATIONAL BUSINESS MACHINES CORPORATION, Armonk, NY (US)

(72) Inventors: Balamurugaramanathan Sivaramalingam, Paramakudi (IN); Sathya Santhar, Ramapuram (IN); Samuel Mathew Jawaharlal, Chennai (IN); Suvedhahari Velusamy, Coimbatore (IN)

(73) Assignee: INTERNATIONAL BUSINESS MACHINES CORPORATION, Armonk, NY (US)

( * ) Notice: Subject to any disclaimer, the term of this patent is extended or adjusted under 35 U.S.C. 154(b) by 0 days.

(21) Appl. No.: 16/561,724

(22) Filed: Sep. 5, 2019

(51) Int. Cl.
| H04W 24/00 | (2009.01) |
| H04W 16/22 | (2009.01) |
| H04M 3/42 | (2006.01) |
| H04W 4/16 | (2009.01) |
| H04W 4/029 | (2018.01) |
| H04M 3/487 | (2006.01) |

(52) U.S. Cl.
CPC ....... *H04W 16/22* (2013.01); *H04M 3/42357* (2013.01); *H04M 3/487* (2013.01); *H04W 4/029* (2018.02); *H04W 4/16* (2013.01)

(58) Field of Classification Search
CPC .............................. H04W 64/00; H04W 4/02
USPC .................. 455/456.1, 456.3, 456.5, 456.6
See application file for complete search history.

(56) References Cited

U.S. PATENT DOCUMENTS

| 6,188,095 | B1 * | 2/2001 | Hieke .................. H01L 27/108 257/296 |
| 6,223,046 | B1 | 4/2001 | Hamill-Keays et al. |
| 6,775,060 | B2 | 8/2004 | Peli et al. |
| 6,799,017 | B1 | 9/2004 | Kregel |
| 2005/0021713 | A1 * | 1/2005 | Dugan .............. H04M 3/42136 709/223 |
| 2005/0041793 | A1 | 2/2005 | Fulton et al. |
| 2008/0268816 | A1 | 10/2008 | Wormald |
| 2014/0179279 | A1 | 6/2014 | Skeba et al. |
| 2017/0171130 | A1 * | 6/2017 | Dyor ....................... H04L 67/18 |
| 2018/0097934 | A1 | 4/2018 | Yalamanchili |

OTHER PUBLICATIONS

Mell et al., "The NIST Definition of Cloud Computing", NIST, Special Publication 800-145, Sep. 2011, 7 pages.

\* cited by examiner

*Primary Examiner* — Temica M Beamer
(74) *Attorney, Agent, or Firm* — Brian Restauro; Andrew D. Wright; Roberts, Calderon, Safran & Cole, P.C.

(57) ABSTRACT

A computer-implemented method includes: receiving, by a computer device, an initial travel plan from a call recipient; identifying, by the computer device, network locations along a route of the initial travel plan, the network locations being geographic locations where a communications network is available to a communication device of the call recipient; and predicting, by the computer device, one or more predicted available time slots of the call recipient, the predicted available time slots being periods of time during which the communication device of the call recipient is predicted to be in one of the network locations along the route, each of the predicted available time slots having a starting time, an ending time, and a duration.

20 Claims, 8 Drawing Sheets

NETWORK AVAILABILITY NOTIFICATION IN PREDEFINED TRAVEL SCENARIOS

BACKGROUND

The present invention relates generally to the availability of a call recipient on a wireless communication network and, more particularly, to predicting the availability of a call recipient on a wireless communication network to receive communications on the network based on a future location of the call recipient and the availability of the network at that location.

The use of mobile communication devices such as cellular telephones is very popular. Many people depend on the availability of service on their communication network for various personal and business needs.

SUMMARY

In a first aspect of the invention, there is a computer-implemented method including: receiving, by a computer device, an initial travel plan from a call recipient; identifying, by the computer device, network locations along a route of the initial travel plan, the network locations being geographic locations where a communications network is available to a communication device of the call recipient; and predicting, by the computer device, one or more predicted available time slots of the call recipient, the predicted available time slots being periods of time during which the communication device of the call recipient is predicted to be in one of the network locations along the route, each of the predicted available time slots having a starting time, an ending time, and a duration.

In another aspect of the invention, there is a computer program product including a computer readable storage medium having program instructions embodied therewith. The program instructions are executable by a computing device to cause the computing device to: receive an initial travel plan from a call recipient; identify network locations along a route of the initial travel plan, the network locations being geographic locations where a communications network is available to a communication device of the call recipient; predict predicted available time slots of the call recipient, the predicted available time slots being periods of time during which the communication device of the call recipient is predicted to be in one of the network locations along the route, the predicted available time slots having a starting time, an ending time, and a duration; track a current location of the call recipient; and update the starting time, the ending time, and the duration of each of the predicted available time slots based on the current location of the call recipient.

In another aspect of the invention, there is system including a processor, a computer readable memory, and a computer readable storage medium. The system includes: program instructions to receive an initial travel plan from a call recipient; program instructions to identify network locations along a route of the initial travel plan, the network locations being geographic locations where a communications network is available to a communication device of the call recipient; program instructions to predict predicted available time slots of the call recipient, the predicted available time slots being periods of time during which the communication device of the call recipient is predicted to be in a network location of the network locations along the route, the predicted available time slots having a starting time, an ending time, and a duration; program instructions to receive a first notification of a first incoming call intended for the call recipient; and program instructions to transmit a first not available message to the communication network in response to receiving the first notification when the call recipient device is located outside of the network locations. The first not available message comprises the starting time and the duration of one of the predicted available time slots. The program instructions are stored on the computer readable storage medium for execution by the processor via the computer readable memory.

BRIEF DESCRIPTION OF THE DRAWINGS

The present invention is described in the detailed description which follows, in reference to the noted plurality of drawings by way of non-limiting examples of exemplary embodiments of the present invention.

DETAILED DESCRIPTION

Figure 1:
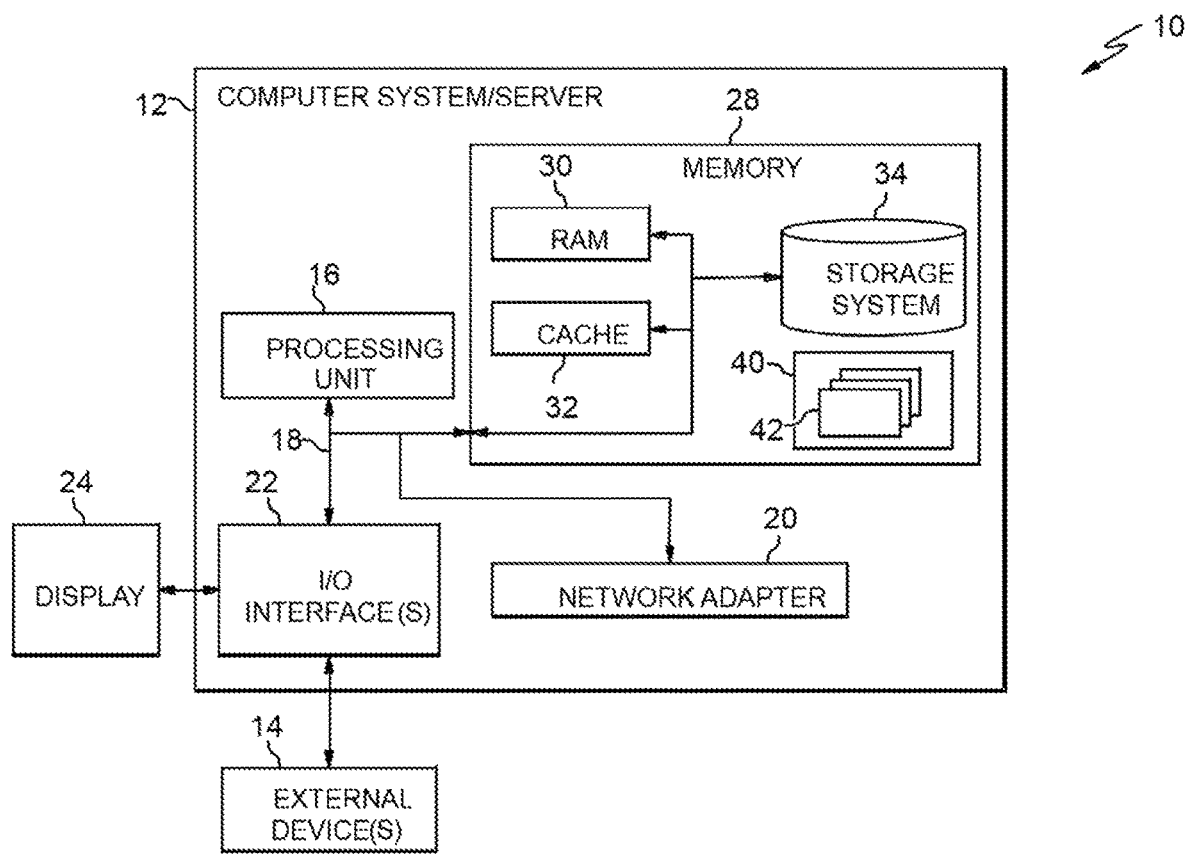
FIG. 1 depicts a cloud computing node according to an embodiment of the present invention.

The present invention relates generally to the availability of a call recipient on a wireless communication network and, more particularly, to predicting the availability of a call recipient on a wireless communication network to receive communications on the network based on a future location of the call recipient and the availability of the network at that location. According to aspects of the invention, a computer device receives notifications of incoming calls to a call recipient of a telecommunications network when the call recipient is traveling. When the call recipient is in a location where there is not network service, the computer device notifies the callers as to when the call recipient is expected to be in a location where there is network service and a duration for which the call recipient will be in the location where there is network service. In embodiments, the computer device prioritizes the incoming calls and considers the prioritizing in determining the time and duration of availability given to each of the callers. In this manner, implementations of the invention advantageously improve the experience of both callers and recipients of mobile communication calls by providing callers with accurate information as to when the recipient will be available to receive a call. In this disclosure, the term "call recipient" is understood to include a recipient of telephone calls, data messages, or any other wireless communication. In this disclosure, the term "caller" is understood to include an initiator of telephone calls, data messages, or any other wireless communication.

To support the ever-growing mobile communications traffic demand, operators of mobile telephony networks are forced to continuously extend the capacity of the existing infrastructure by both implementing new technologies as well as by installing new cell towers to provide more bandwidth for mobile users and improve the network's coverage. However, voice (and other) communication through mobile networks remains less reliable than voice (and other) communication through a fixed line network. Mobile network users can face network availability issues which interfere with a user's attempts to place and/or receive calls. Users also experience calls being dropped, which affects the revenue and the service quality of the mobile network service providers.

These network availability issues are experienced more often while a call recipient is travelling, especially during long distance travel, for example, on trains, on buses, or in automobiles. These issues are due to long distance railway tracks and some roads being located in less crowded places where network service providers do not have a need to provide/ensure network availability. However, when trains and buses pass through more crowded areas (such as residential areas, business districts, or stations), mobile communication users may experience network availability for a period of time before encountering the next area without service. Because of this disrupted network availability, when a caller tries to call a call recipient who is travelling in the train or bus, the call attempt can fail and the caller is not aware when the travelling call recipient will again have mobile network availability.

Embodiments of the invention address this problem by analyzing the call recipient's planned movement to predict the locations where the network will be available to the call recipient. In embodiments, this includes determining the network availability time frame and range based on the service provider network attributes and the mobile communication device's network receiving efficiency.

Embodiments of the invention analyze the travel plan details (such as source, destination, day and time of travel, a travel mode, etc.) shared by a user in a travel tracker module for identifying the exact travel route details using a travel route analyzer module. Embodiments identify the exact places in the travel route with or without network availability of the mobile user's service provider using a network availability analyzer module. Embodiments track the current position of the user and mobile device's network receiving efficiency at the time of travel and calculate time slots when: (1) the mobile user will be available in the service provider's network range; and (2) the mobile device's network receiving efficiency to handle receiving calls is adequate. Embodiments share the time slot information with the core mobile network (MSC) which handles received calls of the mobile user who is travelling. In embodiments, if there is a change in the travel route or travel timing in real time, the user is provided with an option to input those details so that the system can recalculate the network available time slots accordingly and communicate the same to the calling party. Embodiments are also integrated with centralized public transport model/data in such a way that any real time changes to the travel route or travel time (in the case of public transportation) can be handled by the system.

Embodiments notify a calling party that the receiving party (travelling mobile user) will be available within a network coverage only for a particular amount of time, and notifying the calling party that the receiving party would become available in the network approximately at a specific time slot and would be available for the particular amount of time when the receiving party is not available in the network. Embodiments notifying the time slots of availability of the travelling user to multiple parties attempting to call based on a predefined user input, or the system intelligently decides the time slot ratio for each calling party based on past call history.

Embodiments of the invention include systems and methods by which callers placing unsuccessful calls to a call recipient's mobile phone are notified of one or more time periods during which the call recipient is predicted to be in a location of network availability. It is noted that the term "mobile phone" is used herein for simplicity, and that embodiments of the invention include the use of other mobile communication devices.

Implementations of the invention include features that are not well-understood, routine, or conventional activity in the relevant art. For example, predicting a period during which a mobile phone call recipient will be in a service area of a network and transmitting that information to a caller is not well-understood, routine, or conventional. In addition, implementations of the invention are an improvement to the technological field of mobile telecommunications in that an unsuccessful caller is notified of a predicted period during which the recipient of the call will be in an area of network availability.

The present invention may be a system, a method, and/or a computer program product at any possible technical detail level of integration. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punchcards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, configuration data for integrated circuitry, or either source code or object code written in any combination of one or more programming languages, including an object oriented programming language such as Smalltalk, C++, or the like, and procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the blocks may occur out of the order noted in the Figures. For example, two blocks shown in succession may, in fact, be accomplished as one step, executed concurrently, substantially concurrently, in a partially or wholly temporally overlapping manner, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

It is understood in advance that although this disclosure includes a detailed description on cloud computing, implementation of the teachings recited herein are not limited to a cloud computing environment. Rather, embodiments of the present invention are capable of being implemented in conjunction with any other type of computing environment now known or later developed.

Cloud computing is a model of service delivery for enabling convenient, on-demand network access to a shared pool of configurable computing resources (e.g. networks, network bandwidth, servers, processing, memory, storage, applications, virtual machines, and services) that can be rapidly provisioned and released with minimal management effort or interaction with a provider of the service. This cloud model may include at least five characteristics, at least three service models, and at least four deployment models.

Characteristics are as follows:

On-demand self-service: a cloud consumer can unilaterally provision computing capabilities, such as server time and network storage, as needed automatically without requiring human interaction with the service's provider.

Broad network access: capabilities are available over a network and accessed through standard mechanisms that promote use by heterogeneous thin or thick client platforms (e.g., mobile phones, laptops, and PDAs).

Resource pooling: the provider's computing resources are pooled to serve multiple consumers using a multi-tenant model, with different physical and virtual resources dynamically assigned and reassigned according to demand. There is a sense of location independence in that the consumer generally has no control or knowledge over the exact location of the provided resources but may be able to specify location at a higher level of abstraction (e.g., country, state, or datacenter).

Rapid elasticity: capabilities can be rapidly and elastically provisioned, in some cases automatically, to quickly scale out and rapidly released to quickly scale in. To the consumer, the capabilities available for provisioning often appear to be unlimited and can be purchased in any quantity at any time.

Measured service: cloud systems automatically control and optimize resource use by leveraging a metering capability at some level of abstraction appropriate to the type of service (e.g., storage, processing, bandwidth, and active user accounts). Resource usage can be monitored, controlled, and reported providing transparency for both the provider and consumer of the utilized service.

Service Models are as follows:

Software as a Service (SaaS): the capability provided to the consumer is to use the provider's applications running on a cloud infrastructure. The applications are accessible from various client devices through a thin client interface such as a web browser (e.g., web-based e-mail). The consumer does not manage or control the underlying cloud infrastructure including network, servers, operating systems, storage, or even individual application capabilities, with the possible exception of limited user-specific application configuration settings.

Platform as a Service (PaaS): the capability provided to the consumer is to deploy onto the cloud infrastructure consumer-created or acquired applications created using programming languages and tools supported by the provider. The consumer does not manage or control the underlying cloud infrastructure including networks, servers, operating systems, or storage, but has control over the deployed applications and possibly application hosting environment configurations.

Infrastructure as a Service (IaaS): the capability provided to the consumer is to provision processing, storage, networks, and other fundamental computing resources where the consumer is able to deploy and run arbitrary software, which can include operating systems and applications. The consumer does not manage or control the underlying cloud infrastructure but has control over operating systems, storage, deployed applications, and possibly limited control of select networking components (e.g., host firewalls).

Deployment Models are as follows:

Private cloud: the cloud infrastructure is operated solely for an organization. It may be managed by the organization or a third party and may exist on-premises or off-premises.

Community cloud: the cloud infrastructure is shared by several organizations and supports a specific community that has shared concerns (e.g., mission, security requirements, policy, and compliance considerations). It may be managed by the organizations or a third party and may exist on-premises or off-premises.

Public cloud: the cloud infrastructure is made available to the general public or a large industry group and is owned by an organization selling cloud services.

Hybrid cloud: the cloud infrastructure is a composition of two or more clouds (private, community, or public) that remain unique entities but are bound together by standardized or proprietary technology that enables data and application portability (e.g., cloud bursting for load-balancing between clouds).

A cloud computing environment is service oriented with a focus on statelessness, low coupling, modularity, and semantic interoperability. At the heart of cloud computing is an infrastructure comprising a network of interconnected nodes.

Referring now to FIG. 1, a schematic of an example of a cloud computing node is shown. Cloud computing node 10 is only one example of a suitable cloud computing node and is not intended to suggest any limitation as to the scope of use or functionality of embodiments of the invention described herein. Regardless, cloud computing node 10 is capable of being implemented and/or performing any of the functionality set forth hereinabove.

In cloud computing node 10 there is a computer system/server 12, which is operational with numerous other general purpose or special purpose computing system environments or configurations. Examples of well-known computing systems, environments, and/or configurations that may be suitable for use with computer system/server 12 include, but are not limited to, personal computer systems, server computer systems, thin clients, thick clients, hand-held or laptop devices, multiprocessor systems, microprocessor-based systems, set top boxes, programmable consumer electronics, network PCs, minicomputer systems, mainframe computer systems, and distributed cloud computing environments that include any of the above systems or devices, and the like.

Computer system/server 12 may be described in the general context of computer system executable instructions, such as program modules, being executed by a computer system. Generally, program modules may include routines, programs, objects, components, logic, data structures, and so on that perform particular tasks or implement particular abstract data types. Computer system/server 12 may be practiced in distributed cloud computing environments where tasks are performed by remote processing devices that are linked through a communications network. In a distributed cloud computing environment, program modules may be located in both local and remote computer system storage media including memory storage devices.

As shown in FIG. 1, computer system/server 12 in cloud computing node 10 is shown in the form of a general-purpose computing device. The components of computer system/server 12 may include, but are not limited to, one or more processors or processing units 16, a system memory 28, and a bus 18 that couples various system components including system memory 28 to processor 16.

Bus 18 represents one or more of any of several types of bus structures, including a memory bus or memory controller, a peripheral bus, an accelerated graphics port, and a processor or local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnects (PCI) bus.

Computer system/server 12 typically includes a variety of computer system readable media. Such media may be any available media that is accessible by computer system/server 12, and it includes both volatile and non-volatile media, removable and non-removable media.

System memory 28 can include computer system readable media in the form of volatile memory, such as random access memory (RAM) 30 and/or cache memory 32. Computer system/server 12 may further include other removable/non-removable, volatile/non-volatile computer system storage media. By way of example only, storage system 34 can be provided for reading from and writing to a non-removable, non-volatile magnetic media (not shown and typically called a "hard drive"). Although not shown, a magnetic disk drive for reading from and writing to a removable, non-volatile magnetic disk (e.g., a "floppy disk"), and an optical disk drive for reading from or writing to a removable, non-volatile optical disk such as a CD-ROM, DVD-ROM or other optical media can be provided. In such instances, each can be connected to bus 18 by one or more data media interfaces. As will be further depicted and described below, memory 28 may include at least one program product having a set (e.g., at least one) of program modules that are configured to carry out the functions of embodiments of the invention.

Program/utility 40, having a set (at least one) of program modules 42, may be stored in memory 28 by way of example, and not limitation, as well as an operating system, one or more application programs, other program modules, and program data. Each of the operating system, one or more application programs, other program modules, and program data or some combination thereof, may include an implementation of a networking environment. Program modules 42 generally carry out the functions and/or methodologies of embodiments of the invention as described herein.

Computer system/server 12 may also communicate with one or more external devices 14 such as a keyboard, a pointing device, a display 24, etc.; one or more devices that enable a user to interact with computer system/server 12; and/or any devices (e.g., network card, modem, etc.) that enable computer system/server 12 to communicate with one or more other computing devices. Such communication can occur via Input/Output (I/O) interfaces 22. Still yet, computer system/server 12 can communicate with one or more networks such as a local area network (LAN), a general wide area network (WAN), and/or a public network (e.g., the Internet) via network adapter 20. As depicted, network adapter 20 communicates with the other components of computer system/server 12 via bus 18. It should be understood that although not shown, other hardware and/or software components could be used in conjunction with computer system/server 12. Examples, include, but are not limited to: microcode, device drivers, redundant processing units, external disk drive arrays, RAID systems, tape drives, and data archival storage systems, etc.

Figure 2:
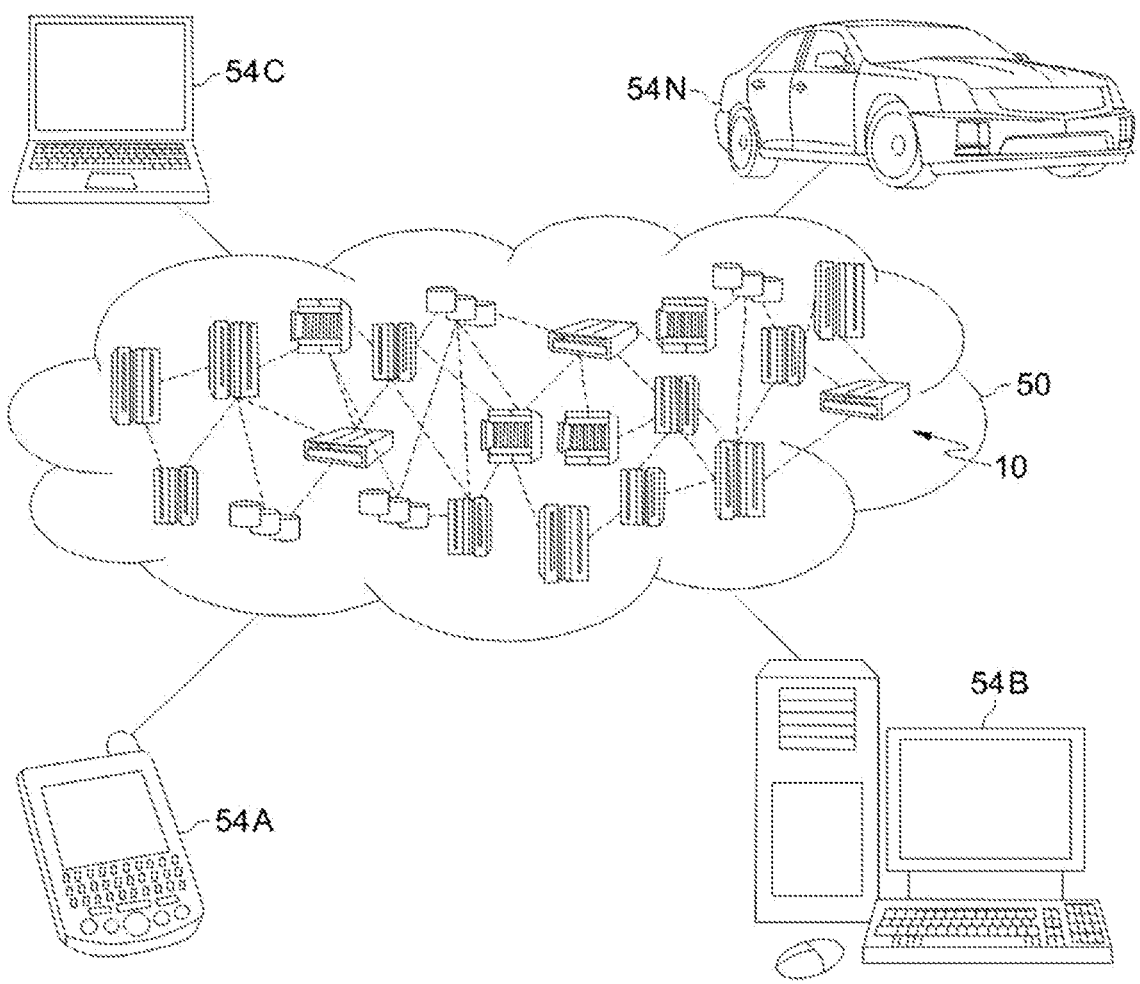
FIG. 2 depicts a cloud computing environment according to an embodiment of the present invention.

Referring now to FIG. 2, illustrative cloud computing environment 50 is depicted. As shown, cloud computing environment 50 comprises one or more cloud computing nodes 10 with which local computing devices used by cloud consumers, such as, for example, personal digital assistant (PDA) or cellular telephone 54A, desktop computer 54B, laptop computer 54C, and/or automobile computer system 54N may communicate. Nodes 10 may communicate with one another. They may be grouped (not shown) physically or virtually, in one or more networks, such as Private, Community, Public, or Hybrid clouds as described hereinabove, or a combination thereof. This allows cloud computing environment 50 to offer infrastructure, platforms and/or software as services for which a cloud consumer does not need to maintain resources on a local computing device. It is understood that the types of computing devices 54A-N shown in FIG. 2 are intended to be illustrative only and that computing nodes 10 and cloud computing environment 50 can communicate with any type of computerized device over any type of network and/or network addressable connection (e.g., using a web browser).

Figure 3:
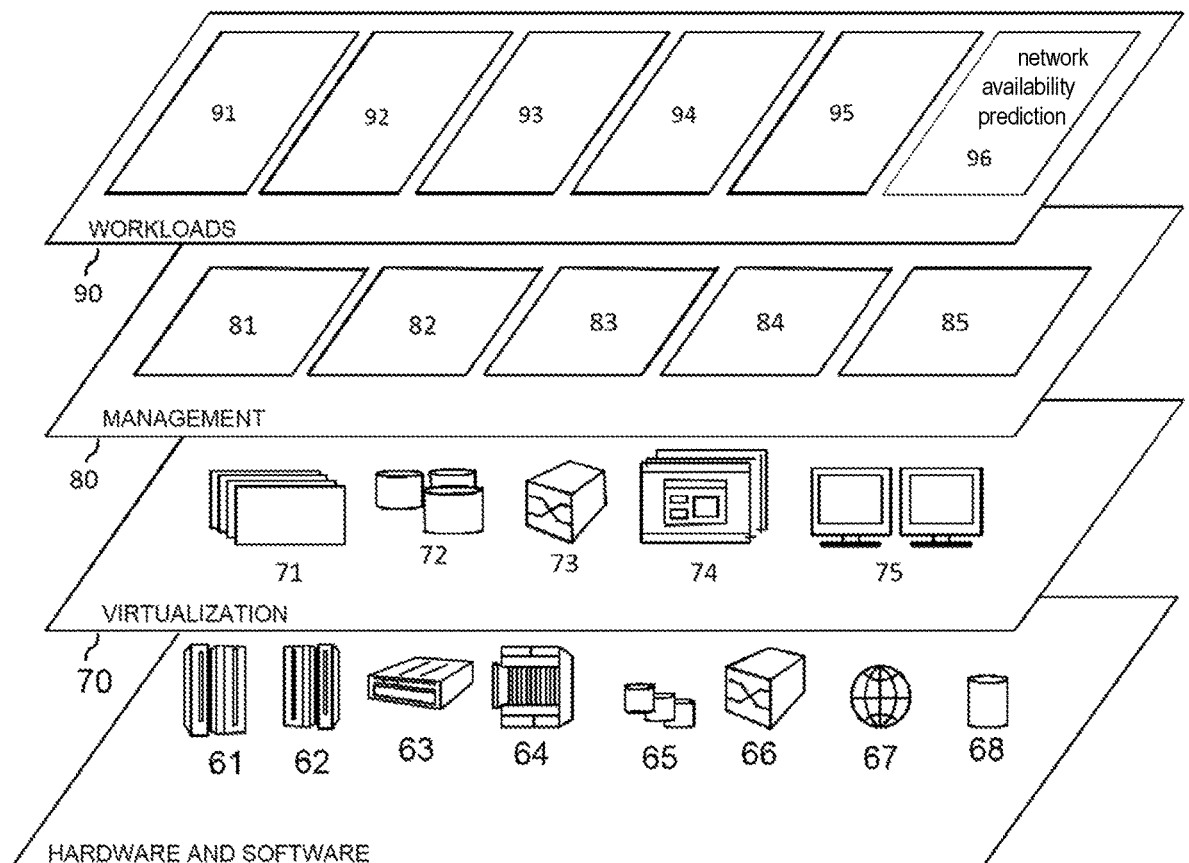
FIG. 3 depicts abstraction model layers according to an embodiment of the present invention.

Referring now to FIG. 3, a set of functional abstraction layers provided by cloud computing environment 50 (FIG. 2) is shown. It should be understood in advance that the components, layers, and functions shown in FIG. 3 are intended to be illustrative only and embodiments of the invention are not limited thereto. As depicted, the following layers and corresponding functions are provided:

Hardware and software layer 60 includes hardware and software components. Examples of hardware components include: mainframes 61; RISC (Reduced Instruction Set Computer) architecture based servers 62; servers 63; blade servers 64; storage devices 65; and networks and networking components 66. In some embodiments, software components include network application server software 67 and database software 68.

Virtualization layer 70 provides an abstraction layer from which the following examples of virtual entities may be provided: virtual servers 71; virtual storage 72; virtual networks 73, including virtual private networks; virtual applications and operating systems 74; and virtual clients 75.

In one example, management layer 80 may provide the functions described below. Resource provisioning 81 provides dynamic procurement of computing resources and other resources that are utilized to perform tasks within the cloud computing environment. Metering and Pricing 82 provide cost tracking as resources are utilized within the cloud computing environment, and billing or invoicing for consumption of these resources. In one example, these resources may comprise application software licenses. Security provides identity verification for cloud consumers and tasks, as well as protection for data and other resources. User portal 83 provides access to the cloud computing environment for consumers and system administrators. Service level management 84 provides cloud computing resource allocation and management such that required service levels are met. Service Level Agreement (SLA) planning and fulfillment 85 provide pre-arrangement for, and procurement of, cloud computing resources for which a future requirement is anticipated in accordance with an SLA.

Workloads layer 90 provides examples of functionality for which the cloud computing environment may be utilized. Examples of workloads and functions which may be provided from this layer include: mapping and navigation 91; software development and lifecycle management 92; virtual classroom education delivery 93; data analytics processing 94; transaction processing 95; and network availability prediction 96.

Implementations of the invention may include a computer system/server 12 of FIG. 1 in which one or more of the program modules 42 are configured to perform (or cause the computer system/server 12 to perform) one of more functions of the network availability prediction 96 of FIG. 3. For example, one or more of the program modules 42 may be configured to: receive an initial travel plan from a user; identify network locations along a route of the initial travel plan, the network locations being geographic locations where a communications network is available to a communication device of the user; and predict predicted available time slots of the user, the predicted available time slots being periods of time during which the communication device of the user is predicted to be in a network location, each of the predicted available time slots having a starting time, an ending time, and a duration.

To the extent implementations of the invention collect, store, or employ personal information provided by, or obtained from, individuals (for example, identification data, network carrier data, and location data, etc.), such information shall be used in accordance with all applicable laws concerning protection of personal information. Additionally, the collection, storage, and use of such information may be subject to consent of the individual to such activity, for example, through "opt-in" or "opt-out" processes as may be appropriate for the situation and type of information. Storage and use of personal information may be in an appropriately secure manner reflective of the type of information, for example, through various encryption and anonymization techniques for particularly sensitive information.

Figure 4:
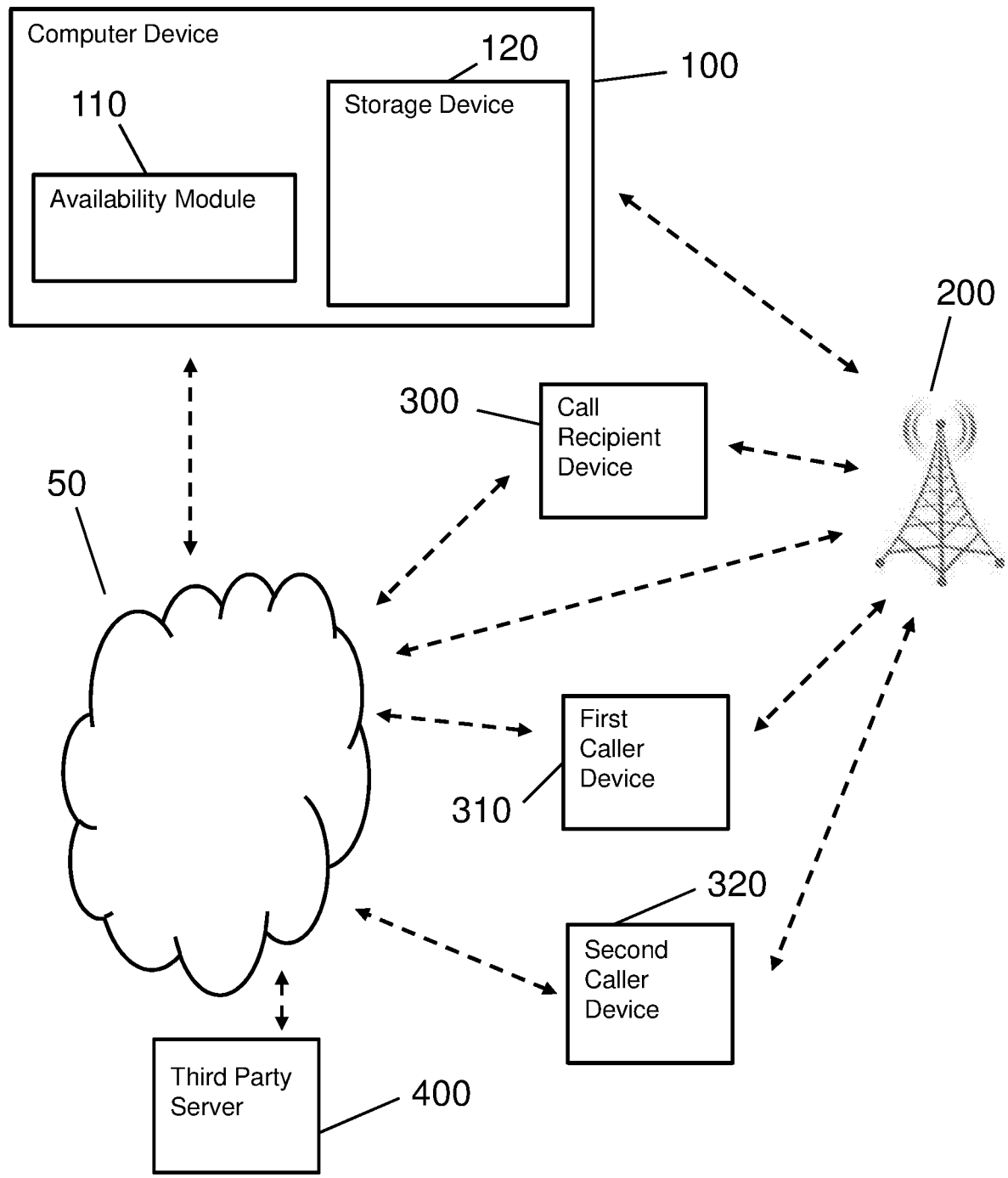
FIG. 4 shows a block diagram of an exemplary environment in accordance with aspects of the invention.

FIG. 4 shows a block diagram of an exemplary environment in accordance with aspects of the invention. In embodiments, the environment includes a computer device 100 such as, for example, computer system/server 12 in FIG. 1. Computer device 100 has an availability module 110 comprising, for example, one or more of program modules 42 in FIG. 1, and a storage device 120 such as, for example, storage system 34 in FIG. 1. Computer device 100 communicates with a call recipient device 300 and a plurality of caller devices such as, for example, first caller device 310 and second caller device 320. In embodiments, computer device 100 simultaneously communicates with a plurality of call recipient devices and a plurality of caller devices.

Examples of call recipient device 300 and caller devices 310, 320 include mobile phones, smart phones, smart watches, tablets, computers, and other communication devices that operate on a communication network. In embodiments, computer device 100 accesses third party data from third party server 400 through, for example, cloud computing environment 50. In the embodiment shown in FIG. 4, computer device 100, call recipient device 300, and caller devices 310, 320 communicate by way of cloud computing environment 50 and/or a communication network 200. In embodiments, communication network 200 includes a cellular communication network. In embodiments, communication network 200 is understood to include a network provider server.

Figure 5:
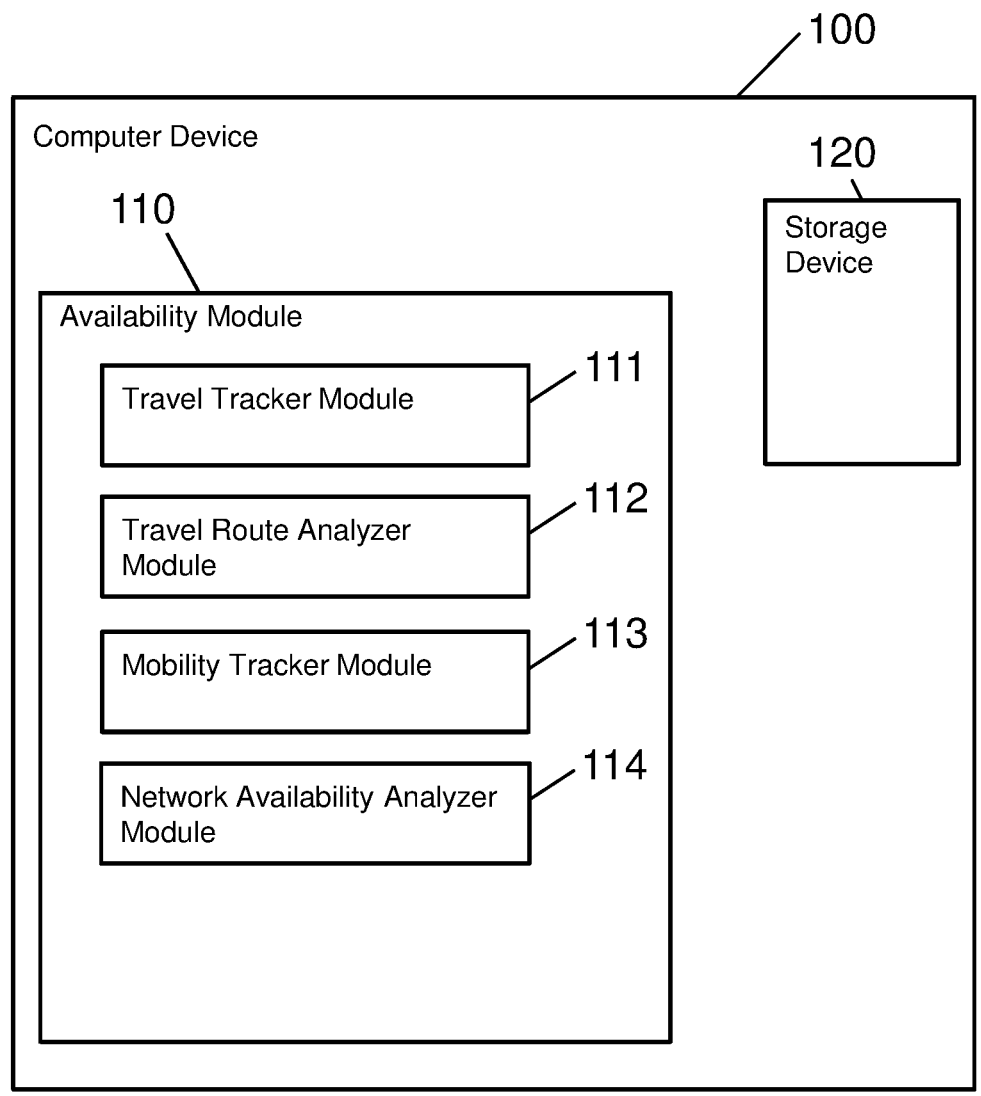
FIG. 5 shows a block diagram of an exemplary environment in accordance with aspects of the invention.

FIG. 5 shows an exemplary embodiment of computer device 100 in which availability module 110 includes a plurality of modules. In this example, availability module 110 includes a travel tracker module 111, a travel route analyzer module 112, a mobility tracker module 113, and a network availability analyzer module 114, each of which may comprise one or more program modules 42 of FIG. 1. Other examples include fewer or more modules than the example shown in FIG. 5. The following discussion is presented in reference to FIGS. 4-6.

In embodiments, a mobile phone call recipient who wants to subscribe to a network availability notification feature provides travel plan details to travel tracker module 111. In embodiments, the travel plan details are a starting point and time, an end point, and a mode of transportation. In embodiments, more detail is provided by the call recipient such as, for example, route details, train numbers, expected travel speed, and other travel details.

In implementations, travel tracker module 111 provides the travel plan details received from the call recipient to travel route analyzer module 112. Travel route analyzer module 112 analyzes the travel plan details and identifies the travel route details. In embodiments, the travel route details provide more detail than the travel plan details. For example, in embodiments, travel route details include train stations at which the train stops, the duration of the stops, train speed, known construction or maintenance that impacts speed, and any other information that impacts the location of the train along the route at any particular time. In embodiments, travel route analyzer module 112 identifies the travel route details by calculating routes between locations along the route identified in the travel plan details. For example, if the call recipient identifies the travel route details as including "the 8:15 am train from Train Station A to Train Station B", travel route analyzer module 112 accesses one or more databases to determine the locations of the train along the route of that particular train and the times at which the train is expected to be at those locations. In embodiments where the call recipient provides the exact travel route details, then travel route analyzer module 112 does not produce the travel route details. In embodiments, travel tracker module 111 and/or travel route analyzer module 112 provide the identified travel route, including the travel route details, to network availability analyzer module 114.

In aspects, network availability analyzer module 114 identifies the places in the travel route where the service provider of the call recipient is expected to have network availability and the places where the service provider network (e.g., cloud computing environment 50 and/or communication network 200) is expected to not be available. In embodiments, network availability analyzer module 114 obtains network availability information from the network provider that indicates the geographic areas where the network is available to call recipient device 300. In embodiments, the network availability information is dependent on the type or model of call recipient device 300. For example, the network availability information for a particular model cellular phone may be different than the network availability information for a different model cellular phone or a particular model tablet. These differences include receiver sensitivity, transmitter power, and other communication device parameters. In embodiments, network availability analyzer module 114 combines the network availability information for call recipient device 300 with the travel route details to identify the geographical locations where call recipient device 300 is predicted to be available on the communication network ("network locations").

In embodiments, mobility tracker module 113 tracks the current location of the call recipient (by tracking the current location of call recipient device 300) and a network receiving efficiency of call recipient device 300. In embodiments, the network receiving efficiency is the ability of call recipient device 300 to connect to communication network 200 and/or cloud computing environment 50, which relates to the signal strength of communication network 200 needed for call recipient device 300 to connect to (or stay connected to) communication network 200. This data is provided to network availability analyzer 114 which predicts the time slots during which call recipient device 300 will be available in the service provider's network range and call recipient device 300's network receiving efficiency.

In embodiments, the call recipient is provided an option of inputting details of any changes in the travel route or travel timing in real time, such that the system recalculates the network available time slots accordingly and communicates the same to the calling party or parties. For example, in embodiments, the call recipient inputs details of any changes by way of a computing device such as, for example, a smart phone, tablet, or personal computer. Embodiments are integrated with centralized public transport models/databases so that network availability analyzer module 114 receives any real time changes to the travel route or travel time of the relevant modes of transport (for example, public transportation) and uses them to update the predicted time slots of availability. Examples of changes include route detours, closed stations, train track blockages, construction, speed limit changes, and other factors that impact the time or location of travel. Network availability analyzer module 114 uses this data to modify the time slots during which call recipient device 300 is predicted to be available. In embodiments, the features of the invention that apply to communications over communication network 200 also apply to communications over cloud computing environment 50.

In embodiments, availability module 110 provides the time slot information predicted by network availability analyzer module 114 to communication network 200, which handles receiving calls that are placed to the call recipient who is in travel. In embodiments, availability module 110 transmits the time slot information to a computer device of communication network 200. In other embodiments, another module or device of computer device 100 transmits the time slot information to communication network 200.

In embodiments, communication network 200 connects a call from a calling party (e.g., using caller device 310) to the call recipient (e.g., using call recipient device 300) when the call recipient is in a network location. In embodiments, communication network 200 also sends a communication to computer device 100 indicating that an incoming call has been placed and connected. Availability module 110 in turn sends a notification to the calling party (either through communication network 200, through some other network, or directly) that the call recipient will be available in network coverage for only a certain period of time.

In embodiments, communication network 200 does not connect a call from a calling party to the call recipient when the call recipient is not in a network location. In embodiments, communication network 200 also sends a communication to computer device 100 indicating that an incoming call has been placed, but cannot be connected. Availability module 110 in turn sends a notification to the calling party (either through communication network 200, through some other network, or directly) that the call recipient will become available in the network at a specific time slot (for example, a start time, end time, and duration).

In embodiments, when multiple callers attempt to contact the call recipient, the system shares the call recipient's total available time based on predefined call recipient input and/or based on the system intelligently deciding a time slot ratio for each caller based on past call history. For example, in embodiments, availability module 110 of computer device 100 assigns a higher priority to a caller that has a large number of completed calls to the call recipient than a caller that has a smaller number of completed calls to the call recipient. In another example, availability module 110 of computer device 100 assigns a higher priority to a caller whose average call length in short than a caller whose average call length is longer. In embodiments, availability module 110 assigns a high priority to callers whose calls have previously been taken by the call recipient as a result of the call recipient ending a concurrent call with another person. In embodiments, call history and/or other data used to determine priority is stored with the network service provider and/or in storage device 120 (i.e., somewhere other than on call recipient device 300) so that computer device 100 can access the data when call recipient device 300 is not available.

The availability information transmitted to communication network 200 by availability module 110 described above enables the communication network service provider(s) to notify the calling parties to be aware of the approximate available time for making calls to the call recipient and the available time period. This significantly increases the service quality of the communication network service providers.

Figure 6:
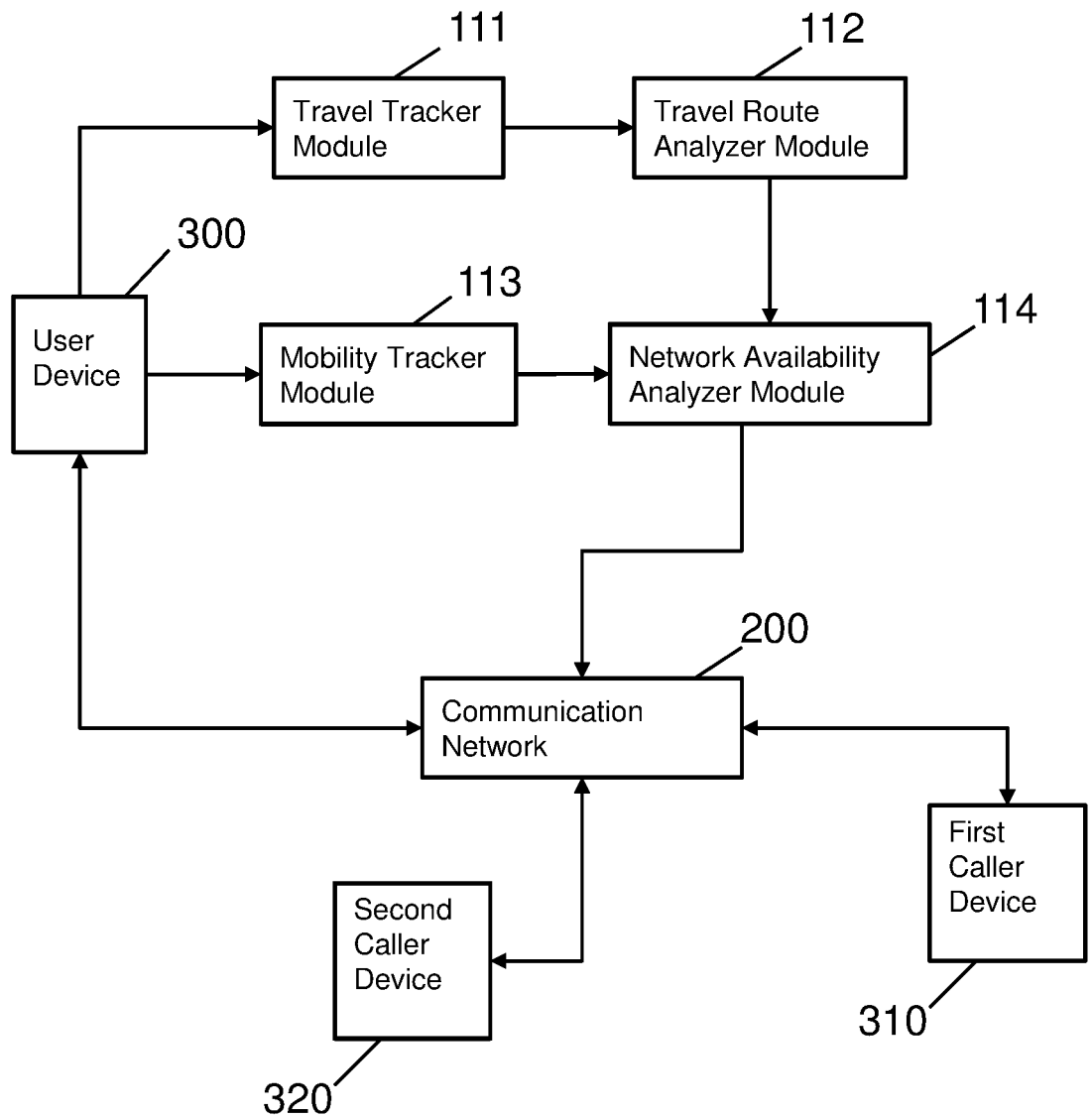
FIG. 6 shows a flow diagram in accordance with aspects of the invention.

Referring to FIG. 6, embodiments of the invention include travel tracker module 111, travel route analyzer module 112, mobility tracker module 113, and network availability analyzer module 114. In embodiments, a mobile phone (or other) call recipient who wants to subscribe to the network availability notification feature provides confirmed travel plan details (like source, destination, day and time of travel, travel mode, etc.) to travel tracker module 111 by way of an input device such as a smart phone, tablet, personal computer, or other input device. In embodiments, this information is also, or alternatively, retrieved by computer device 100 using existing call recipient profiling and data mining methodologies.

Travel tracker module 111 provides the travel plan details to travel route analyzer module 112 which analyzes the travel plan details and identifies the travel route details by accessing, for example, third party maps, transportation mode routes, and other data. In embodiments, the call recipient provides the travel route details them self and this step is abbreviated or skipped. Travel route analyzer module 112 provides an identified travel route (based on the exact travel route details) to network availability analyzer module 114. In embodiments, network availability analyzer module 114 identifies the places in the travel route where communication network 200 has network availability as well as the places where communication network 200 is not available by accessing network coverage data on servers of the network service provider.

When the trip begins, mobility tracker module 113 tracks the current position of the call recipient and the network receiving efficiency of call recipient device 300. Mobility tracker module 113 provides this data to network availability analyzer module 114 which predicts the time slots when the call recipient is expected to be available in the service provider's network range and the ability of call recipient device 300 to receive calls (based on the network receiving efficiency of call recipient device 300).

Network availability analyzer module 114 provides the call recipient (i.e., call recipient device 300) an option to input details of any change in the travel route or travel timing in real time, and computer device 100 recalculates the network available time slots accordingly and communicates the same to any calling parties. In embodiments, computer device 100 integrates with centralized public transport models in such a way that any real time changes to the travel route or travel time are shared with computer device 100. Network availability analyzer module 114 provides this data to communication network 200 (or a core mobile network or mobile switching center of communications network 200), which handles receiving calls made to the call recipient who is in travel. When the calling party (i.e., first caller device 310) attempts to place a call to the travelling call recipient, communications network 200 connects the call when the traveling call recipient is available in communication network 200, and availability module 110 (or some other part of computer device 100) sends a notification (for example, through communication network 200) to the calling party that the call recipient will only be available (in communication network 200 coverage) for a certain amount of time. When the travelling call recipient is not available in communication network 200, computer device 100 (e.g., availability module 110) sends a notification (for example, through communication network 200) to the calling party that the call recipient will become available in communication network 200 at an approximate time slot and will only be available for a certain amount of time.

In an illustrative example, when a caller A (e.g., first caller device 310) places an unsuccessful call to the call recipient who is travelling on a train (e.g., call recipient device 300), computer device 100 notifies caller A that the call recipient will be available in network range starting in fifteen minutes for a very short period of time (for example, one minute) and that the call recipient will be available in two hours for a period of twenty minutes. Similarly, for example, if multiple callers X, Y and Z place unsuccessful calls to the call recipient, the system notifies caller X that the call recipient will be available (in network range) after fifteen minutes for a very short period of time as caller X's call is identified (by availability module 110) as being critical and more relevant based on past call history (e.g., from storage device 120). In this example, computer device 100 notifies caller Y that the call recipient will be available for ten minutes beginning twenty-three minutes from now, and computer device 100 notifies caller Z that the call recipient will be available for five minutes seventeen minutes from now. In this example, availability module 110 prioritizes the three calls based on call recipient preference or relevancy based on prior call details. This enables the network service provider(s) (e.g., communication network 200) of the callers (or the call recipient) to notify the callers so that they are aware of the approximate available time for making their calls and the available time period, which significantly increases the service quality of the communication service provided by the telecom service providers.

Figure 7:
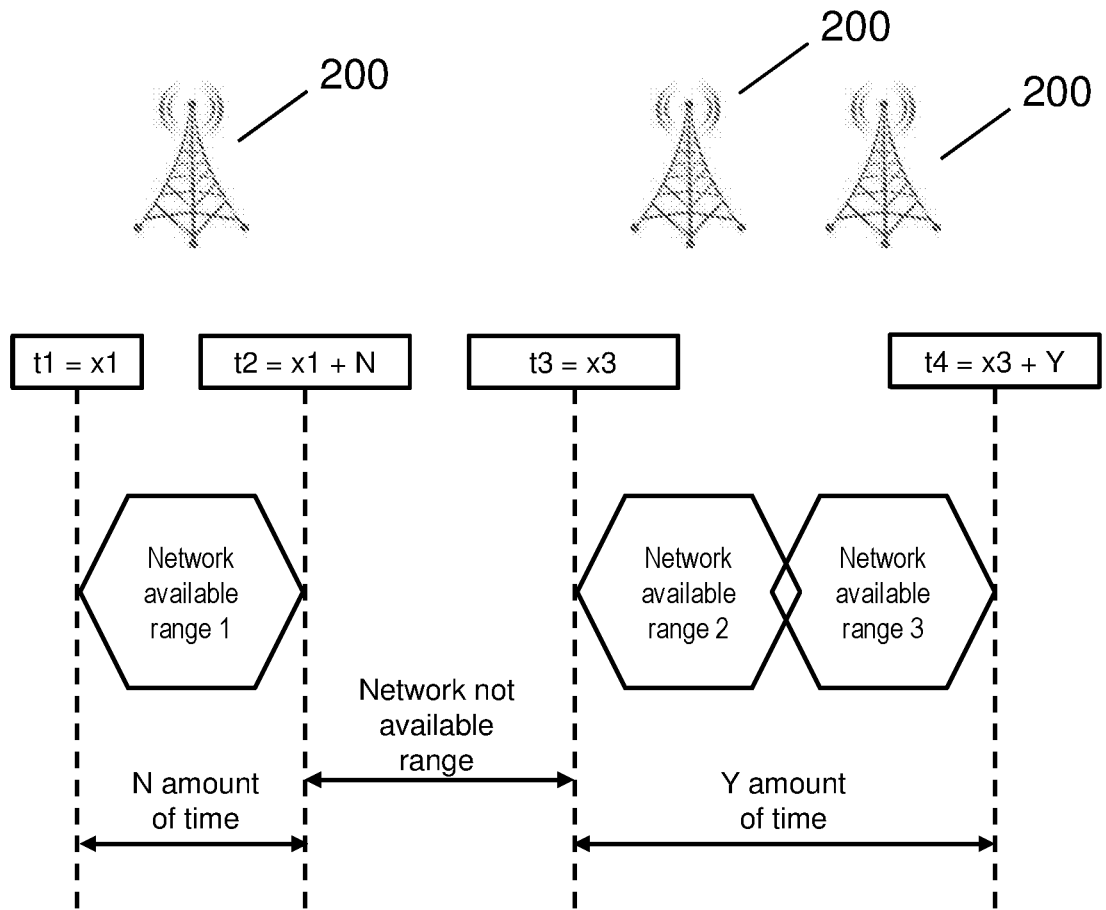
FIG. 7 shows an exemplary scenario in accordance with aspects of the invention.

FIG. 7 shows an exemplary scenario of availability of communication network 200. In this example, communication network 200 becomes available to the call recipient at time t1 at location x1. Communication network 200 is available for N amount of time while the call recipient is located in network available range 1. At time t2 (which is equal to t1+N, and is N amount of time after the call recipient leaves location x1), the call recipient moves out of network available range 1 and into an area where communication network 200 is not available to the call recipient. At time t3, when the call recipient is at location x3, the call recipient enters network availability range 2. Before the call recipient leaves network availability range 2, the call recipient enters network availability range 3 because network availability range 2 and network availability range 3 overlap. The call recipient has network availability of a duration of Y while the call recipient is in network availability range 2 and/or network availability range 3. At time t4 (which is equal to t3+Y, and is Y amount of time after the call recipient leaves location x3)), the call recipient moves out of network available range 3 and into an area where communication network 200 is not available to the call recipient. FIG. 7 is just one example of network availability that the call recipient can encounter and that embodiments of the invention process to provide notifications to callers.

Figure 8:
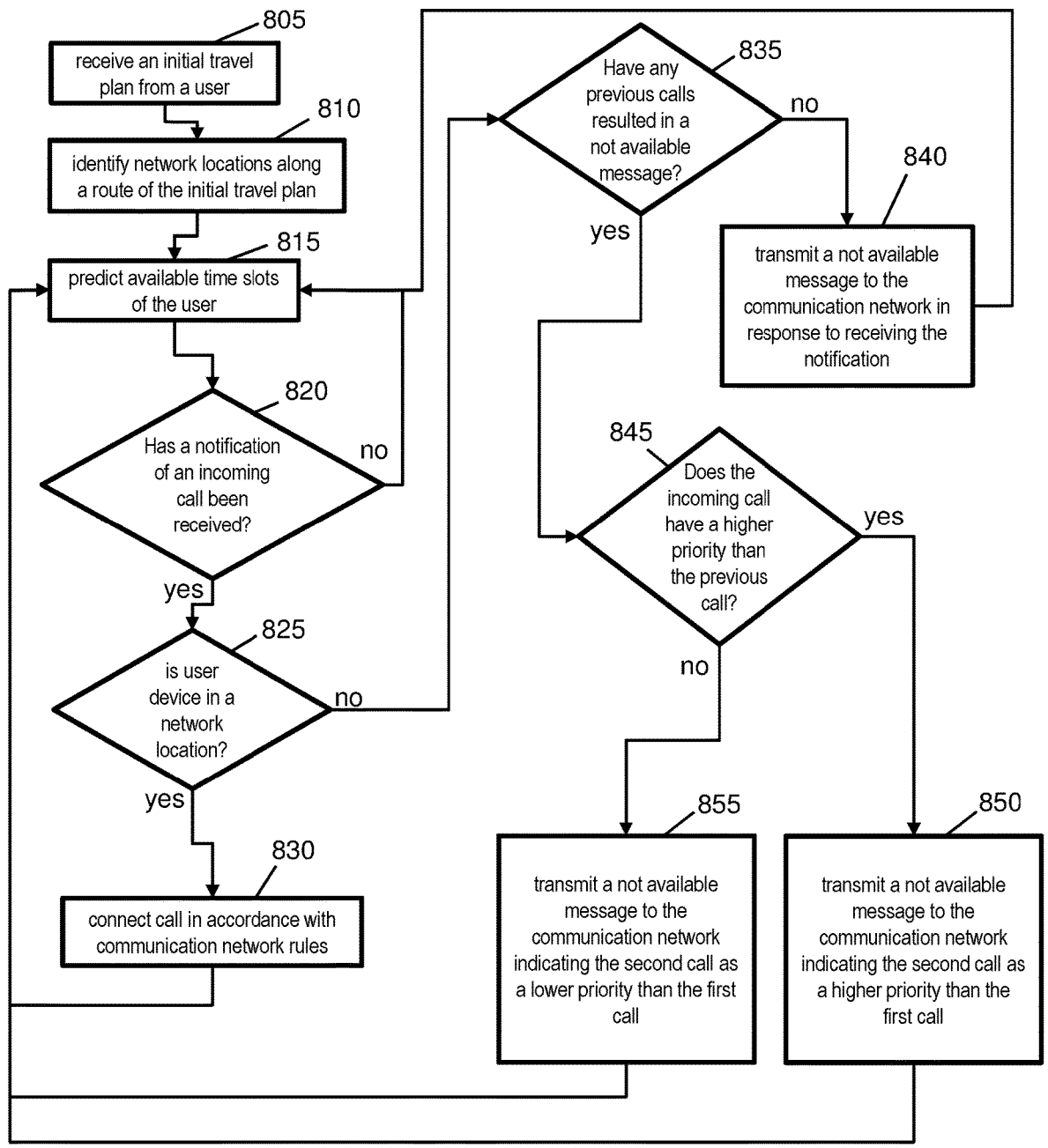
FIG. 8 shows a flowchart of an exemplary method in accordance with aspects of the invention.

FIG. 8 shows a flowchart of an exemplary method in accordance with aspects of the present invention that address multiple callers calling the call recipient. Steps of the method may be carried out in the environments of FIGS. 4-6 and are described with reference to elements depicted in FIGS. 4-6.

At step 805, computer device 100 receives an initial travel plan from a call recipient (e.g., call recipient device 300). In embodiments, and as described with respect to FIG. 6, travel tracker module 111 receives input such as destination, day and time of travel, and travel mode from the call recipient. At step 810, computer device 100 identifies network locations along a route of the initial travel plan. In embodiments, and as described with respect to FIG. 6, network availability analyzer module 114 identifies the places in the travel route where communication network 200 has network availability ("network locations"), as well as the places where communication network 200 is not available. At step 815, computer device 100 predicts time slots of the call recipient. In embodiments, and as described with respect to FIG. 6, mobility tracker module 113 provides data to network availability analyzer module 114 which predicts the time slots when the call recipient is expected to be available in the service provider's network range. At step 820, computer device 100 determines if a notification of an incoming call has been received. If, at step 820, computer device 100 has not received a notification of an incoming call, processing returns to step 815 where network availability analyzer module 114 updates the time slot predictions as described above. If, at step 820, computer device 100 has received a notification of an incoming call, processing continues to step 825.

At step 825, computer device 100 determines if call recipient device 300 is in a network location. In embodiments, computer device 100 uses a global positioning system (GPS) and/or other positioning systems to determine the location of call recipient device 300 (and therefore, the call recipient). In embodiments, computer device 100 uses GPS data from call recipient device 300 and/or GPS data from an automobile or other vehicle. In embodiments, network availability analyzer module 114 compares the location information of the call recipient to the network locations to determine if the call recipient is in one of the network locations. If, at step 825, computer device 100 determines that the call recipient is in a network location, then processing continues to step 830. At step 830, computer device 100 notifies communication network 200 that the call can be completed in accordance with the rules of the communication network 200, for example. If, at step 825, computer device 100 determines that the call recipient is not in a network location, processing continues to step 835.

At step 835, computer device 100 determines if any previous calls resulted in a not available message being sent to a caller based on historic call data (e.g., from storage device 120). In embodiments, the relevant previous calls are previous calls received during the current period in which the call recipient is not in a network location (as determined in step 825). If, at step 835, computer device 100 determines that no previous calls have resulted in a not available message, then processing continues to step 840 where computer device 100 transmits a not available message to communication network 200 in response to receiving the notification of an incoming call (in step 820). In embodiments, availability module 110 transmits the not available message to communication network 200 for communication network 200 to send to the caller. If, at step 835, computer device 100 determines that previous calls have resulted in a not available message, then processing continues to step 845.

At step 845, computer device 100 determines if the incoming call has a higher priority than the previous call(s). As discussed above, in embodiments, call priority is determined by the number of calls that a caller has completed to the call recipient, and/or the average call length of calls that a caller has completed with the call recipient. If, at step 845, computer device 100 determines that the incoming call has a higher priority than the previous caller, then processing continues to step 850 where the system transmits a not available message to the communication network indicating the second call as a higher priority than the first call. In embodiments, availability module 110 transmits the not available message to communication network 200 for communication network 200 to send to the caller. If, at step 845, computer device 100 determines that the incoming call does not have a higher priority than the previous caller, then processing continues to step 855 where computer device 100 transmits a not available message to the communication network indicating the second call as a lower priority than the first call. In embodiments, availability module 110 transmits the not available message to communication network 200 for communication network 200 to send to the caller. After the not available message is transmitted in step 850 or step 855, processing returns to step 815 where the time slots are continually updated.

As described above, in embodiments, the not available messages include the predicted time slots (times and durations) of availability of the call recipient. In embodiments, network availability analyzer module 114 determines the predicted time slots.

In embodiments, a service provider could offer to perform the processes described herein. In this case, the service provider can create, maintain, deploy, support, etc., the computer infrastructure that performs the process steps of the invention for one or more customers. These customers may be, for example, any business that uses technology. In return, the service provider can receive payment from the customer(s) under a subscription and/or fee agreement and/or the service provider can receive payment from the sale of advertising content to one or more third parties.

In still additional embodiments, the invention provides a computer-implemented method, via a network. In this case, a computer infrastructure, such as computer system/server 12 (FIG. 1), can be provided and one or more systems for performing the processes of the invention can be obtained (e.g., created, purchased, used, modified, etc.) and deployed to the computer infrastructure. To this extent, the deployment of a system can comprise one or more of: (1) installing program code on a computing device, such as computer system/server 12 (as shown in FIG. 1), from a computer-readable medium; (2) adding one or more computing devices to the computer infrastructure; and (3) incorporating and/or modifying one or more existing systems of the computer infrastructure to enable the computer infrastructure to perform the processes of the invention.

The descriptions of the various embodiments of the present invention have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

What is claimed is:

1. A computer-implemented method comprising:
   receiving, by a computer device, an initial travel plan from a call recipient;
   identifying, by the computer device, network locations along a route of the initial travel plan, the network locations being geographic locations where a communications network is available to a communication device of the call recipient; and
   predicting, by the computer device, one or more predicted available time slots of the call recipient, the predicted available time slots being periods of time during which the communication device of the call recipient is predicted to be in one of the network locations along the route, each of the predicted available time slots having a starting time, an ending time, and a duration;
   receiving, by the computer device, a first notification of a first incoming call intended for the call recipient; and
   transmitting, by the computer device, a first not available message to the communication network in response to receiving the first notification when the call recipient device is located outside of the network locations,
   wherein the first not available message comprises the starting time of one of the predicted available time slots.

2. The computer-implemented method of claim 1, further comprising determining, by the computer device, initial travel route details based on the initial travel plan, the initial travel route details including the route.

3. The computer-implemented method of claim 1, further comprising receiving, by the computer device, initial travel route details, the initial travel route details including the route.

4. The computer-implemented method of claim 1, wherein the predicting includes predicting one of the predicted available timeslots for the network locations along the route.

5. The computer-implemented method of claim 4, further comprising:
   tracking, by the computer device, a current location of the call recipient; and
   updating, by the computer device, the starting time, the ending time, and the duration of the predicted available time slots based on the current location of the call recipient.

6. The computer-implemented method of claim 1, further comprising:
   tracking, by the computer device, a current location of the call recipient; and
   updating, by the computer device, the starting time, the ending time, and the duration of the predicted available time slots based on the current location of the call recipient.

7. The computer-implemented method of claim 1, wherein the first not available message comprises the duration of the one of the predicted available time slots.

8. The computer-implemented method of claim 1, further comprising determining, by the computer device, that a caller of the first incoming call is on a contact list of the call recipient.

9. The computer-implemented method of claim 8, wherein the contact list resides on the computer device.

10. The computer-implemented method of claim 8, wherein the transmitting of the first not available message is further in response to the caller being on the contact list.

11. The computer-implemented method of claim 1, further comprising:
    receiving, by the computer device, a second notification of a second incoming call intended for the call recipient;
    transmitting, by the computer device, a second not available message to the communication network in response to receiving the second notification when the call recipient device is located outside of the network locations;
    comparing, by the computer device, a first caller of the first incoming call to a second caller of the second incoming call; and
    determining, by the computer device and based on the comparing, that the second caller is a higher priority caller than the first caller,
    wherein the second not available message comprises the starting time and the duration of a particular one of the predicted available times, and
    the starting time of the first not available message is chronologically after the particular one of the predetermined available times.

12. The computer-implemented method of claim 1, wherein the computer device includes software provided as a service in a cloud computing environment.

13. A computer program product, the computer program product comprising a computer readable storage medium having program instructions embodied therewith, the program instructions executable by a computing device to cause the computing device to:
    receive an initial travel plan from a call recipient;
    identify network locations along a route of the initial travel plan, the network locations being geographic locations where a communications network is available to a communication device of the call recipient;

predict predicted available time slots of the call recipient, the predicted available time slots being periods of time during which the communication device of the call recipient is predicted to be in one of the network locations along the route, the predicted available time slots having a starting time, an ending time, and a duration;

track a current location of the call recipient;

update the starting time, the ending time, and the duration of each of the predicted available time slots based on the current location of the call recipient;

receive a first notification of a first incoming call intended for the call recipient; and transmit a first not available message to the communication network in response to receiving the first notification when the call recipient device is located outside of the network locations, wherein the first not available message comprises the starting time and the duration of one of the predicted available time slots.

14. The computer program product of claim 13, further comprising program instructions executable by the computing device to cause the computing device to determine whether a caller of the first incoming call is on a contact list of the call recipient, wherein the contact list resides on the computing device, and the transmitting of the first not available message is further in response to the caller being on the contact list.

15. A system comprising:

a processor, a computer readable memory, and a computer readable storage medium;

program instructions to receive an initial travel plan from a call recipient;

program instructions to identify network locations along a route of the initial travel plan, the network locations being geographic locations where a communications network is available to a communication device of the call recipient;

program instructions to predict predicted available time slots of the call recipient, the predicted available time slots being periods of time during which the communication device of the call recipient is predicted to be in a network location of the network locations along the route, the predicted available time slots having a starting time, an ending time, and a duration;

program instructions to receive a first notification of a first incoming call intended for the call recipient; and program instructions to transmit a first not available message to the communication network in response to receiving the first notification when the call recipient device is located outside of the network locations, wherein the first not available message comprises the starting time and the duration of one of the predicted available time slots, and the program instructions are stored on the computer readable storage medium for execution by the processor via the computer readable memory.

16. The system of claim 15, further comprising:

program instructions to track a current location of the call recipient; and program instructions to update the starting time, the ending time, and the duration of the predicted available time slots based on the current location of the call recipient.

17. The system of claim 16, further comprising program instructions to compare a caller of the first incoming call to a contact list of the call recipient, wherein the contact list resides on the computer device, and the transmitting of the first not available message is further in response to the caller being on the contact list.

18. The computer program product of claim 13, further comprising program instructions executable by the computing device to cause the computing device to receive initial travel route details, the initial travel route details including the route.

19. The system of claim 15, further comprising program instructions to receive initial travel route details, the initial travel route details including the route.

20. The system of claim 15, further comprising program instructions to determine initial travel route details based on the initial travel plan, the initial travel route details including the route.

* * * * *